United States Patent Office 3,305,676
Patented Feb. 21, 1967

3,305,676
FUNCTION GENERATORS
Etienne Augustin Henry Honore and Emile Leon Gabriel Torcheux, both of 79 Blvd. Haussmann, Paris, France
Filed Dec. 24, 1962, Ser. No. 246,776
Claims priority, application France, Dec. 29, 1961, 883,417
7 Claims. (Cl. 235—197)

The present invention relates to analog computing systems adapted to deliver an output voltage which is proportional to a given function of a variable $x$, in a given range of variation thereof.

The variable $x$ may be represented by an analog magnitude which may be, for example, a mechanical or an electrical magnitude.

It is known that, within a given range of variation of a variable $x$, any function $f(x)$ may be substituted, with a good approximation, by a polynomial $S$ of degree $n$, which takes on the same value as function $f(x)$ for $(n+1)$ values $x_1$ to $x_{n+1}$ of variable $x$.

It is also known that a polynomial $S$ of degree $n$ may always be defined as the weighted sum of $(n+1)$ polynomials $P_1$ to $P_{n+1}$ of the same degree.

The invention is based on the utilization of polynomials $P_1$ to $P_{n+1}$ which are selected as follows:

For each one of the above $(n+1)$ values $x_1$ to $x_{n+1}$, say value $x_i$, all the polynomials $P_1$ to $P_{n+1}$ take on the value 0, except for polynomial $P_i$, which takes on a value different from 0, for example the value 1.

The arrangement according to the invention comprises in combination the following elements:

(a) A multiplier system which, upon reception of an analog value of $x$, is capable of multiplying it by $n$ voltages $u_1$ to $u_n$;

(b) A system for performing a weighted summation with fixed coefficients, which, upon reception of a voltage taken as unity and of the $n$ voltage values $u_1 x$ to $u_n x$, is capable of delivering voltages $P_1(x)$ to $P_{n+1}(x)$, $P_1$ to $P_{n+1}$ being the above defined polynomials;

(c) Another system for performing a weighted summation, which system, upon reception of the $n+1$ voltages $P_1$ to $P_{n+1}$, multiplies them respectively by the $n+1$ coefficients $K$ to $K_{n+1}$, and delivers at its output the weighted sum:

$$S = K_1 P_1 + K_2 P_2 + \ldots K_{n+1} P_{n+1}$$

This system is arranged for varying at will coefficients $K_1$ to $K_{n+1}$.

As will be seen further in the description, this results in the function $f(x)$ being readily displayed or simulated.

By way of a non limitative example, an embodiment of the invention, with $n=5$, will now be described, with reference to the appended drawings, wherein.

Figure 1:
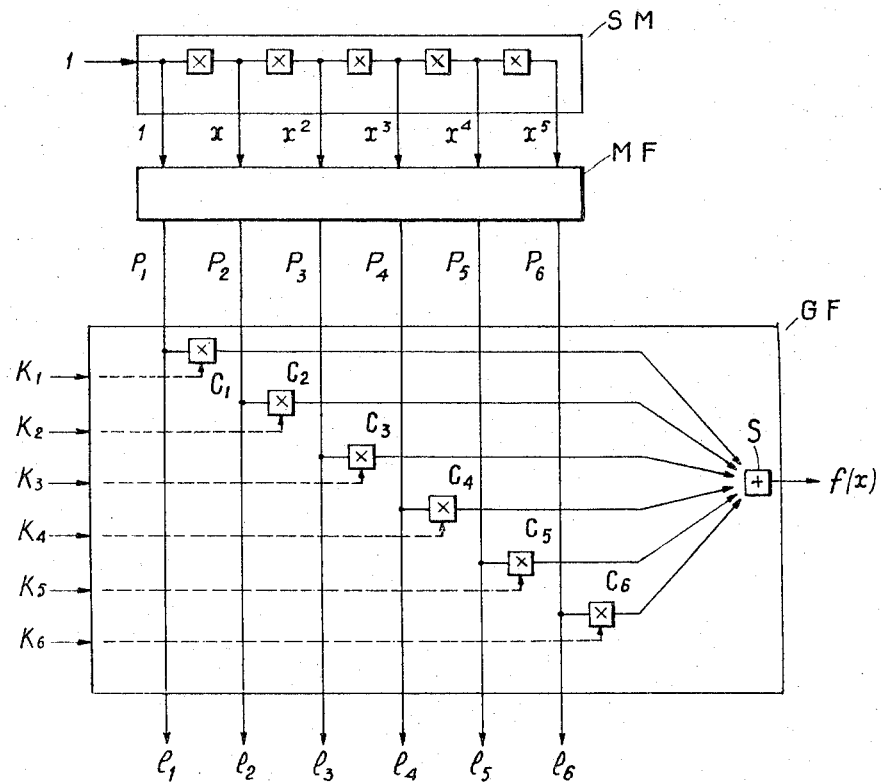
FIG. 1 shows very diagrammatically an arrangement according to the invention.

The arrangement shown in FIG. 1 comprises:

(a) A system SM which, upon reception of an input voltage taken as unity, delivers at its output five voltages $x$, $x^2$, $x^3$, $x^4$, $x^5$, in addition to the unity voltage;

(b) A system MF, which receives the five voltages $x$ to $x^5$ and delivers analog voltage values of six preselected polynomials of the fifth degree $P_1$ to $P_6$; system MF comprises, for example, a multiplying and adding arrangement as described in the U.S. Patent 2,785,853 issued to the applicants. This arrangement is made of a plurality of interconnected quadripoles, and possesses inputs for receiving voltages respectively proportional to $x \ldots x^5$, adjusting means and outputs for delivering voltages respectively proportional to polynomials $P_1$ to $P_6$. Such an arrangement is shown in FIGURE 6 of the cited patent, and described from line 55, column 7, to line 58, column 8.

(c) A further system GF which receives the six voltage values $P_1$ to $P_6$ and multiplies them respectively by six adjustable coefficients $K_1$ through $K_6$, by means of six adjustable multiplying networks $C_1$ through $C_6$.

System GF also comprises a summation network which receives the six above weighted voltages and provides the voltage-sum $$f(x) = S = \Sigma K_p P_p$$

In the non limitative example described, the variation range of the variable $x$ extends from $-1$ to $+1$ i.e. $-1 < x < +1$, and the six values $x_1$ to $x_6$ are $-1$, $-0.6$, $-0.2$, $+0.2$, $+0.6$, $+1$.

For these values of $x$, polynomials $P$ are selected to have the following respective values:

| Values of Variable $x$ | Values of Polynomials | | | | | |
|---|---|---|---|---|---|---|
| | $P_1$ | $P_2$ | $P_3$ | $P_4$ | $P_5$ | $P_6$ |
| $x_1 = -1$ | 1 | 0 | 0 | 0 | 0 | 0 |
| $x_2 = -0.6$ | 0 | 1 | 0 | 0 | 0 | 0 |
| $x_3 = -0.2$ | 0 | 0 | 1 | 0 | 0 | 0 |
| $x_4 = +0.2$ | 0 | 0 | 0 | 1 | 0 | 0 |
| $x_5 = +0.6$ | 0 | 0 | 0 | 0 | 1 | 0 |
| $x_6 = +1$ | 0 | 0 | 0 | 0 | 0 | 1 |

If values of function $f(x_1)$, $f(x_2) \ldots f(x_6)$ are known, polynomial $S$, which approximates the value of function $f(x)$ and which takes on values $f(x_1) \ldots f(x_6)$ respectively for values $x_1 \ldots x_6$, is given by the expression:

$$S = f(x_1) P_1 + f(x_2) P_2 + \ldots f(x_6) P_6$$

for the selected values of $P_1$ to $P_6$, since, when variable $x$ takes on value $x_1$, $S(x_1) = f(x_1)$, polynomials $P_2 \ldots P_6$ being zero and polynomial $P_1 = 1$. Similarly, when variable $x$ takes on value $x_2$, $S = f(x_2)$ and so on.

Figure 2:
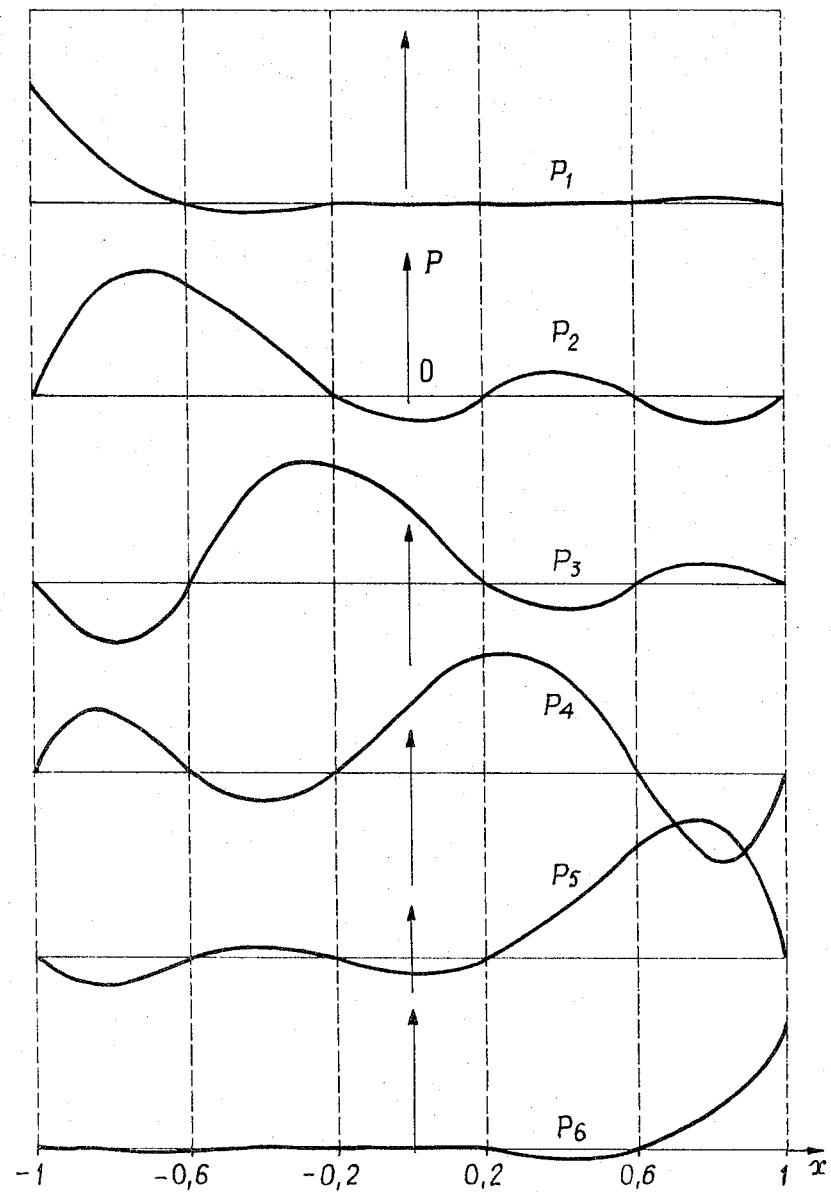
FIG. 2 represents the variation, as a function of $x$, of polynomials $P_1$ to $P_6$, which may be selected in a system according to the invention.

FIG. 2 shows the variation of polynomials $P_1$ to $P_6$ as a function of $x$, between $x = -1$ and $x = +1$. It may be readily seen that the curves of polynomials $P_4$, $P_5$ and $P_6$ are respectively derived from those of polynomials $P_3$, $P_2$ and $P_1$, with which they are symmetric with respect to axis OP.

The curves representing polynomes $P_1$ to $P_6$ cross the $x$-axis at five points and take on value 1 for a sixth values of $x$ which is $x_1$, $x_2 \ldots x_6$, as the case may be.

Figure 3:
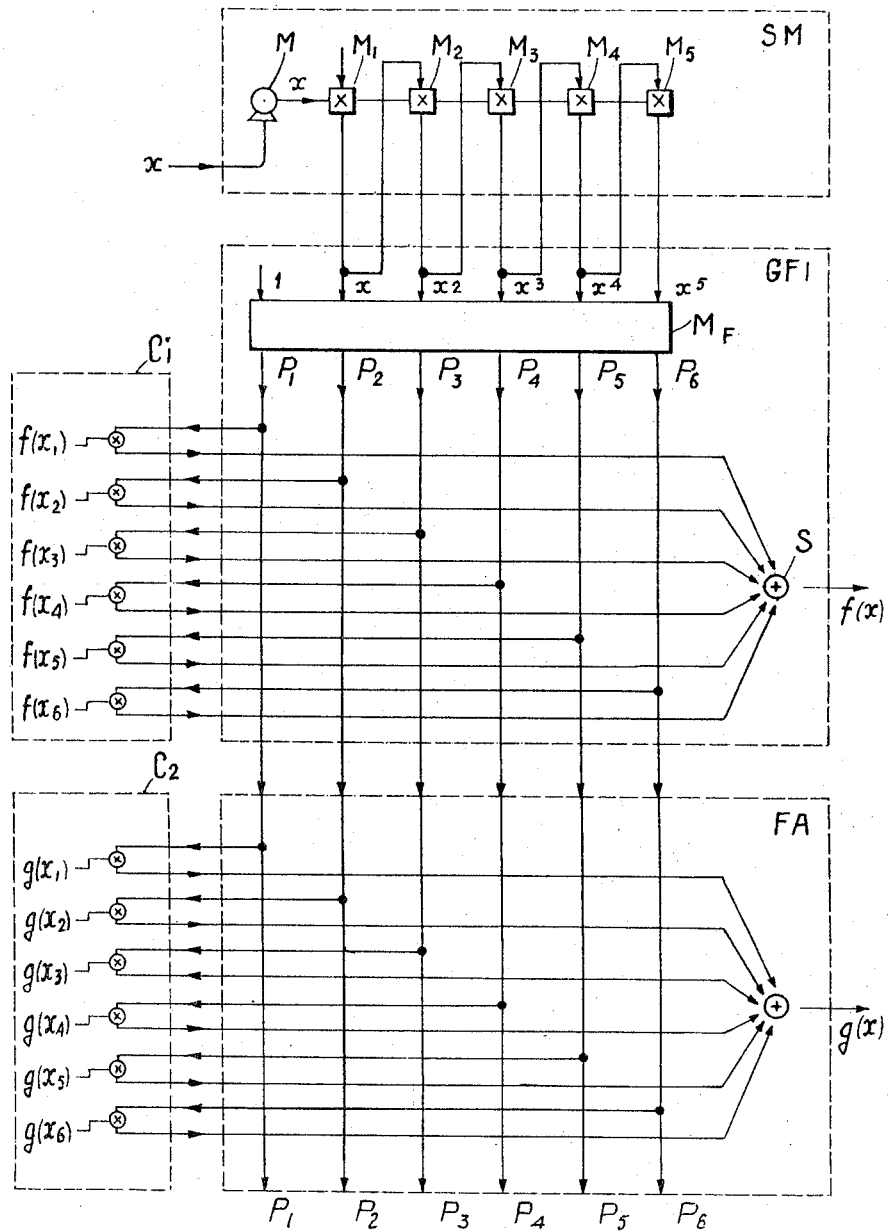
FIG. 3 shows, very diagrammatically, an embodiment given by way of example of the diagram illustrated in FIG. 1.

FIG. 3 shows, by way of example, one embodiment of the arrangement illustrated in FIG. 1.

The system M comprises a source, for example, a servo-mechanism 2M, controlled to represent variable $x$. This source controls multiplying networks, for example of the type disclosed in the United States Patent 2,785,853, which, upon receiving an input voltage $u$, deliver an output voltage $ux$. There are five such networks $M_1$ to $-M_5$. Network $M_1$ receives the unity voltage and delivers voltage $x$, network $M_2$ receives voltage $x$ and delivers voltage $x^2$. Network $M_3$ receives voltage $x^2$ and delivers voltage $x^3$. Networks $M_4$ and $M_5$ respectively receive voltage $x^3$ and $x^4$ and delivers voltage $x^4$ and $x^5$.

Voltages 1, $x$, $x^2$, $x^3$, $x^4$ and $x^5$ are connected to a system $GF_1$ which is equipped with multiplier networks, for example also of the type described in the above mentioned patent, which perform on voltages 1, $x, \ldots x^5$ operations necessary for obtaining output voltages which simulate respectively the above mentioned polynomials $P_1$ to $P_5$.

System MF is incorporated into a system GF1 which comprises further multiplier networks $C_1$ and a summation network S.

In multiplier networks $C_1$ polynomials $P_1$ to $P_5$ are respectively multiplied by values $f(x_p)$. These networks are adjustable, as described in the above mentioned patent for obtaining the desired multiplication. The respective outputs are added to each other in the summation network S, at the output of which a voltage $S=\Sigma f(x_p)P_p$ is collected.

Said voltage S simulates with good approximation the function $f(x)$ in the range $-1<x<1$, the approximation obtained being the better, as the variations of the function $f(x)$ are smoother. Thus, for the function $y=\cos \pi x/2$, the approximation is of the order $\frac{1}{1000}$.

It is possible to add, to the arrangement so far described a system FA, which comprises another multiplier network $C_2$, similar to network $C_1$, except that the multiplier factors are $g(x_p)$ instead of $f(x_p)$, and another summing circuit S. System FA receives voltages $P_1$ to $-P_6$ and provides a voltage $S=\Sigma g(x_p)P_p$, which gives an approximate representation of a further function $g(x)$.

Figure 4:
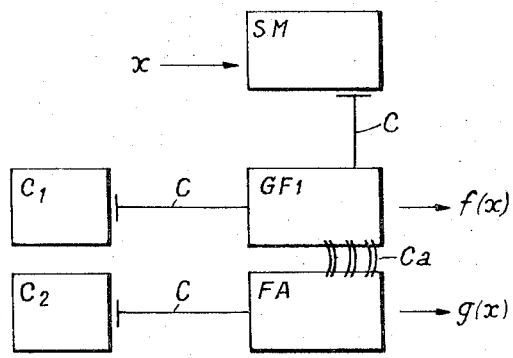
FIG. 4 shows the writing arrangement for the system shown in FIG. 3.

FIG. 4 shows the connection of the assembly of FIG. 3. The same references designate the same elements as in the preceding figure. Cables C and jumpers Ca insure the necessary connections.

Figure 5:
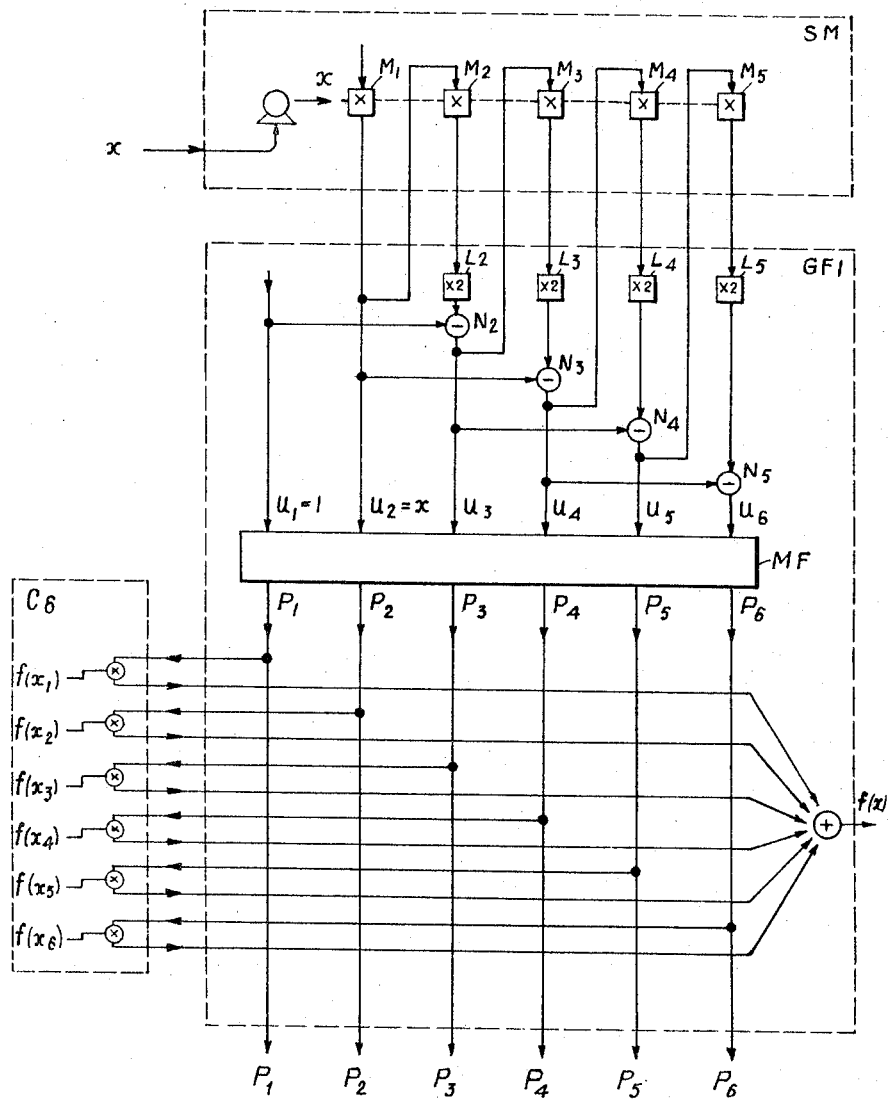
FIG. 5 shows, very diagrammatically, a further embodiment of the system according to the invention.

FIG. 5 is another embodiment of the arrangement according to the invention. This arrangement is aimed at simplifying system MF, the multiplication coefficients of which may vary in the proportion of 1 to 1000 which complicates the structure of the network. To minimize this drawback, intermediate polynomials $u_1$ to $u_6$ are used. They are derived from one another, according to the law $u_p=2xu_{p-1}-u_{p-2}$.

Accordingly, if $u_1=1$ and $u_2=x$:

$u_3=2x^2-1$
$u_4=2x(2x^2-1)-x=4x^3-3x$
$u_5=2x(4x^3-3x)-(2x^2-1)=8x^4-8x^2+1$
$u_6=16x^5-20x^3+5x$.

The system is similar to that of FIG. 3, except that subtracting and multiplying circuits are inserted at the input of system MF for providing analog voltage values of the above polynomials $u_1$ to $u_6$ which are then fed to system MF. This arrangement will now be described in more detail.

System SM is identical to that of FIGURE 3.
System GF1 comprises:

Multiplier networks $L_2$ to $L_5$, having a common multiplication factor equal to 2 and the inputs of which are respectively connected to the outputs of networks $M_2$ to $M_5$.

Subtracting networks $N_2$ to $-N_5$ which receive respectively the output voltages of networks $L_2$ to $L_5$, network $N_2$ receiving in addition the unity voltage, while networks $N_3$, $N_4$ and $N_5$, respectively, receive the output voltages of networks $x$, $N_2$ and $N_3$. With these connections made, $N_2$ delivers voltage $u_3=2xu_1-1$;
$N_3$ delivers voltage $u_4=2xu_2-u_1$;
$N_4$ delivers voltage $u_5=2xu_3-u_2$;
$N_5$ delivers voltage $u_6=2xu_4-u_3$.

The unity voltage and voltages $u_1$ to $u_6$ are applied to system MF in the same manner as voltages $x_1$ to $x_6$ in FIG. 3 to provide the previously polynomials $P_1 \ldots P_6$.

Of course the invention is not limited to the embodiments described which were given solely by way of example.

What is claimed, is:

1. An analog computing system for representing a given function $f(x)$ of a variable $x$, within a given range of variation thereof comprising: means for providing a voltage value analog to $x$; means for multiplying said value by $n$ predetermined magnitudes $u_1$ to $u_n$; means for performing $n$ weighted summations of said voltages $u_1 \ldots u_n$ multiplied by said predetermined magnitude, thus delivering $n$ voltages $P_1$ to $P_n$; and means for performing a weighted summation of said $n$ voltages $P_1$ to $P_n$.

2. An analog computing system for representing a given function $f(x)$ of a variable $x$, within a given range of variation thereof comprising: means for providing a voltage value analog to $x$; means for multiplying said values by $n$ predetermined magnitudes $u_1$ to $u_n$; means for performing a weighted summation of said voltages $u_1 \ldots u_n$ multiplied by $n$ predetermined magnitude for delivering $n$ voltage values $P_1$ to $P_n$, said values being respectively equal to 1 for a different one of $n+1$ equispaced values $x_1$ to $x_{n+1}$ of $x$ within said range and equal to 0 for the other said values; and means for performing a weighted summation of said $n$ voltages $P_1$ to $P_n$, the weighting coefficients being respectively equal to $f(x_1)$ to $f(x_{n+1})$.

3. An analog computing system for representing a function $f(x)$ within a given range of variation of $x$, comprising: means for providing the analog voltage value of a polynomial S of degree $n$, which takes on the same values as function $f(x)$ for $(n+1)$ values of $x_1$ to $x_{n+1}$ of $x$, said means including means for providing $(n+1)$ analog voltage values of terms respectively of degree 0 to $n$ in $x$; means for deriving from said terms analog voltage values of $n+1$ polynomials of degree $n$ in $x$; and means for making a weighted sum of said analog voltage values of said polynomials equal to S.

4. An analog system for representing a function $f(x)$ within a given range of variation of $x$ comprising: means for providing the analog voltage value of a polynomial S of degree $n$, which takes on the same values as function $f(x)$ for $(n+1)$ values of $x_1$ to $x_{n+1}$ of $x$ equispaced within said range, said means including means for providing analog voltage values of $(n+1)$ terms respectively of degree 0 to $n$ in $x$, means for deriving from said terms analog voltage values of $n+1$ polynomials of degree $n$ in $x$ and means for making a weighted sum of said analog voltage values of said polynomials equal to S, said polynomials taking on the 0 value for all said equispaced values, except respectively for one different of said values for which all of them take the same value and the weighting factors of said polynomials being respectively $f(x_1)$ to $f(x_{n+1})$.

5. An analog computing system for receiving an input reference voltage and delivering an output voltage the ratio between input and said output voltages being proportional to a given function $f(x)$ of a variable $x$ within a given range of variation thereof, said system comprising: a servosystem having an input for receiving a magnitude analog to said variable $x$ and an output means; $n$ multiplying networks $M_1$ to $M_n$ controlled by said output means, any network $M_j$, $j$ being equal to 1 to $n$, being arranged for receiving voltage value analog to $x^{j-1}$, and delivering a first output voltage value analog to $x^j$; a first summating system coupled to said networks for receiving said voltage values $x$ to $x^n$ and delivering $n+1$ second output voltages respectively equal to $n$ weighted sums of said first voltages with fixed predetermined coefficients and proportional respectively to $n$ predetermined polynomial functions $P_1-P_{n+1}$, any said polynomial function $P_K$ being equal to 1 for a predetermined value $x_K$ of said interval; K being equal to 0, 1 $\ldots n$, $x_1 \ldots x_n$ being equispaced values of $x$ in said interval, and 0 for said equispaced values, except $x_K$; a second weighted summing system for receiving said second output voltages, and for multiplying them respectively by predetermined coefficients $f_1 \ldots f_n$, $f_K$ being the value of $f(x)$ for $x=x_K$.

6. An analog computing system for receiving an input reference voltage, and delivering an output voltage, the ratio between said input and output voltages being proportional to a function $f(x)$ of a variable $x$ within a given range of variation thereof, and taking the same values as $f(x)$ for $x=x_K$, K being any integer between 1 and $n$, $x_1$ to $x_n$ being equispaced values of $x$ in said range, said system comprising: a servosystem having an input for receiving an analog value of said variable $x$, and an output means; $n$ multiplying networks $M_1$ to $M_n$, controlled by said output means and having a multiplying ratio equal to $x$, said networks having respective inputs and outputs, said inputs and said outputs of said cells being cascade connected between the input of the first network $M_1$ and said output of network $M_n$ for furnishing respective output voltages proportional to $x$, $x^2 \ldots x^n$; a first summing system receiving said $n$ voltages, $x$, $x^2 \ldots x^n$ and $n$ outputs providing respectively $n$ output voltages equal to weighted sums $P_1$ to $P_n$ of $x \ldots x^n$ multiplied by predetermined coefficients; $P_K$ being a polynomial of the $n^{th}$ order, equal to zero for the respective values $x_1$ to $x_n$ except for $x_K$, and having for $x_K$ the value equal to 1; a second weighted summing system for receiving said second output voltages and for multiplying them respectively by predetermined coefficients $f_1 \ldots f_n$, $f_K$ being the value of $f(x)$ for $x=x_K$.

7. An analog computing system for receiving an input reference voltage, and delivering an output voltage, the ratio between said input and output voltages being proportional to a function $f(x)$ of a variable $x$, within a given range of variation thereof, and taking the same values as $f(x)$ for $x=x_K$, K being any integer between 1 and $n$, $x_1$ to $x_n$ being equispaced values of $x$ in said range, said system comprising: a servosystem having an input for receiving an analog value of said variable $x$, and an output means; $n-1$ multiplying networks $M_1$ to $M_{n-1}$, controlled by said output means and having a multiplying ratio equal to $x$. said networks having respective inputs and outputs. $n-2$ multiplying networks $L_2$ to $L_{n-1}$ having respective inputs, outputs and a multiplication ratio equal to 2, $n-2$ substracting networks $N_2$ to $N_{n-1}$ having respectively first and second inputs and outputs, said inputs of each of said networks $L_2$ to $L_{n-1}$ being respectively connected to the outputs of networks $M_2$ to $M_{n-1}$ having the same number, the first input of each network $N_K$ being connected to the output of said subtracting network of number $K-2$, the second input of said network $N_K$ being connected to the network $L_K$ for providing respectively $n$ voltages $u_1$ to $u_n$, with $u_n=2xu_{n-1}-u_{n-2}$, $n \geq 3$, a first summing system receiving said $n$ voltages $u_1$ to $u_n$ and $n$ outputs providing respectively $n$ output voltages $P_1$ to $P_n$ equal to weight sums of $u_1 \ldots u_n$ multiplied by predetermined coefficient, $P_K$ being a polynomial of the $n^{th}$ order, equal to zero for the respective values $x_1$ to $x_n$ except for $x_K$, and having for $x_K$ the value equal to 1; a second weighted summing system for receiving said second output voltages, and for multiplying them respectively by predetermined coefficients $f_1 \ldots f_n$, $f_K$ being the value of $f(x)$ for $x=x_K$.

References Cited by the Examiner

UNITED STATES PATENTS

| 2,910,237 | 10/1959 | Meyer et al. | 235—164 |
| 3,023,966 | 3/1962 | Cox et al. | 235—181 |
| 3,038,069 | 6/1962 | Tuller | 235—181 X |
| 3,051,386 | 8/1962 | Fayard | 235—197 X |
| 3,110,802 | 11/1963 | Ingham et al. | 235—197 |
| 3,136,974 | 6/1964 | Sirks | 235—181 X |
| 3,217,148 | 11/1965 | Robinson | 235—197 X |

MALCOLM A. MORRISON, *Primary Examiner.*

I. KESCHNER, *Assistant Examiner.*